(12) United States Patent
Morishita

(10) Patent No.: US 7,088,073 B2
(45) Date of Patent: Aug. 8, 2006

(54) INVERTER DRIVE SYSTEM

(75) Inventor: Takashi Morishita, Houston, TX (US)

(73) Assignee: Toshiba Internationl Corporation, Houston, TX (US)

( * ) Notice: Subject to any disclaimer, the term of this patent is extended or adjusted under 35 U.S.C. 154(b) by 330 days.

(21) Appl. No.: 10/350,076

(22) Filed: Jan. 24, 2003

(65) Prior Publication Data

US 2004/0145337 A1 Jul. 29, 2004

(51) Int. Cl.
*H02P 27/04* (2006.01)

(52) U.S. Cl. ............... 318/801; 318/767; 318/771; 318/800

(58) Field of Classification Search ......... 318/767, 318/771, 799–811
See application file for complete search history.

(56) References Cited

U.S. PATENT DOCUMENTS

| | | | |
|---|---|---|---|
| 3,500,166 A | | 3/1970 | Mesenhimer et al. |
| 3,824,442 A | * | 7/1974 | King .................. 363/137 |
| 4,638,177 A | * | 1/1987 | Takach et al. ............ 307/83 |
| 4,675,800 A | | 6/1987 | Seki et al. |
| 5,142,213 A | * | 8/1992 | Stelter .................. 318/771 |
| 5,191,518 A | * | 3/1993 | Recker et al. ............. 363/71 |
| 5,469,655 A | * | 11/1995 | Lin ....................... 47/83 |
| 5,625,545 A | | 4/1997 | Hammond |
| 5,801,936 A | * | 9/1998 | Mori et al. ............. 363/132 |
| 5,969,966 A | | 10/1999 | Sawa et al. |
| 6,058,031 A | * | 5/2000 | Lyons et al. ............ 363/67 |
| 6,229,722 B1 | | 5/2001 | Ichikawa et al. |
| 6,329,907 B1 | * | 12/2001 | Uischner et al. ......... 340/333 |
| 6,369,543 B1 | * | 4/2002 | Masselus et al. ......... 318/700 |
| 6,377,478 B1 | | 4/2002 | Morishita |
| 6,522,561 B1 | * | 2/2003 | Wobben ............... 363/132 |

FOREIGN PATENT DOCUMENTS

| | | |
|---|---|---|
| DE | 195 19 424 A1 | 11/1996 |
| JP | 2-202324 | 8/1990 |
| JP | 02-202324 | * 8/1990 |
| JP | 08 324901 | 4/1997 |

OTHER PUBLICATIONS

European Search Report dated Dec. 8, 2005.

* cited by examiner

*Primary Examiner*—Marlon T. Fletcher
*Assistant Examiner*—Tyrone Smith
(74) *Attorney, Agent, or Firm*—Banner & Witcoff, Ltd.

(57) ABSTRACT

Systems and methods are provided for dynamically changing configurations of multi-inverter drive systems. By changing configurations during operation, a multi-inverter system of the present invention can provide greater than half of full output power during failure of a power cell and can provide efficient braking torque during regeneration. The inverter drive system includes a plurality of single pole inverter cells and a configuration switch system connecting the single pole inverter cells in a star configuration and for changing the connection configuration of the single pole inverter cells. In one embodiment, the configuration switch system is adapted to dynamically change the star configuration of the inverter system to a mesh configuration during operation of the load. In another embodiment, the configuration switch system is adapted to dynamically change the star configuration of the single pole inverter cells to form a polyphase inverter.

10 Claims, 8 Drawing Sheets

| | No Cell Failure | SNP-U Failure FL-U: ON | SNP-V Failure FL-V: ON | SNP-W Failure FL-W: ON |
|---|---|---|---|---|
| CTT-U | OFF | OFF | ON | ON |
| CTT-V | OFF | ON | OFF | ON |
| CTT-W | OFF | ON | ON | OFF |
| CTT-N | ON | OFF | OFF | OFF |
| Output Voltage | U 120° W V | W 60° V U | W 60° V U | W 60° V U |

| | Normal Running | |
|---|---|---|
| CTT-N | ON | OFF |
| CTT-D | OFF | ON |
| CTT-B | OFF | ON |
| Inverter Drive System | Single Pole NPC WYEConnection | 3∅ NPC with Braking circuit |

# INVERTER DRIVE SYSTEM

TECHNICAL FIELD

This invention relates generally to an inverter drive system. More particularly, the invention concerns an inverter drive system having changeable configurations, which may permit continued operation of the drive system with the loss of an inverter cell or provide efficient regenerative braking.

BACKGROUND

Voltage-fed inverters are known in the art as devices that generally receive a DC voltage source at their input and provide either a single phase or a polyphase AC voltage output. The DC voltage source is often obtained from a utility line or other AC source through a rectifier and a filter. The AC voltage output is typically a regulated AC voltage that is generally unaffected by load parameters. Such devices have a variety of uses, such as driving AC motors or providing power for AC uninterruptible power supplies (UPSs). A multi-inverter drive system is often used to provide three-phase power to a load, such as an AC induction motor.

These systems may be connected in various configurations providing different advantages. For example, single-phase inverters may be configured in either a star or a mesh configuration for collectively providing polyphase output. A three-phase star configuration, also known as a wye configuration, generally includes single-phase inverters that share a common neutral for collectively providing three-phase power. A three-phase mesh configuration, also known as a delta configuration, generally includes single-phase inverters that are each connected to two adjacent inverters to form a serial loop for collectively providing three-phase power. A polyphase inverter, which is a single inverter that provides multiple phases of power, such as a three-phase inverter, may also provide certain advantages.

Each of these configurations may provide advantages in varying situations. For example, polyphase inverters may require fewer parts and therefore be less expensive than a comparable configuration of single-phase inverters. Further, single-phase inverters in a polyphase configuration may provide more controlled output than a polyphase inverter. Additionally, for providing polyphase output, star configurations versus mesh configurations may be preferable in different circumstances. Although each of these systems as well as combinations of these systems are known, an inverter system having a particular configuration may not be optimal for driving all operational stages of a load or for all circumstances. Thus, it may be desirable for an inverter system to be able to dynamically change configurations to accommodate different operational stages and different circumstances.

One such circumstance in which a configuration change may be desirable is the loss of an inverter cell. Typically, multi-inverter drives systems are not able to function with the loss of an inverter power cell. However, single phase multi-inverter systems configured to provide polyphase output are known that can provide reduced power to a load when one of the inverter power cells becomes inoperable. For example, FIG. 1 shows a single pole multi-inverter system 10 having failure related circuitry known in the art for providing reduced power when an inverter power cell fails. The system 10 includes a high voltage three-phase power source 12, a transformer 14, six isolated single pole inverter cells SPI-UL through SPI-W2 16, and a load 18, such as a three-phase AC induction motor. Pairs of power cells, SPI-U1 and U2, SPI-V1 and V2, and SPI-W1 and W2, are each connected in series to provide each phase of output power, U, V, and W respectively.

FIG. 2 is a circuit diagram of one of the single pole inverter cells 16. Each single pole inverter cell 16 as shown is a conventional full bridge three-level inverter, which generates an AC voltage wave cycling between positive, zero and negative levels. The rectifier bridge (REC) 20 of each inverter 16 receives three-phase power from transformer 14 and converts it to DC power. C 22 is a DC voltage smoothing capacitor and GTR1 through GTR4 24 are transistors for inverting DC power to AC power. A braking circuit 26 is often added to such a conventional system 10 for dissipating excess voltage generated during deceleration of motor 18. Braking circuit 26 typically includes a braking resistor DBR and a braking transistor GTR5. FIG. 3 shows the three-phase inverter circuit for conventional system 10. By-pass circuits CTT-U1 through CTT-W2 28 may be added to system 10 in parallel with each inverter cell 16 for respectively by-passing cells as needed.

During full-power operation of system 10, by-pass circuits 28 are open and full current with full voltage is applied to load 18 as generated though matching pairs of inverter cells. When one cell, for example SPI-U1, is broken, by-pass circuits CTT-U1, CTT-V1 and CTT-W1 are closed. As such, SPI-U1, SPI-V1 and SPI-W1 are bypassed and SPI-U2, SPI-V2 and SPI-W2 collectively provide reduced three-phase power as an inverter circuit in a wye configuration. However, the resulting inverter circuit only provides half the voltage with full current to the output load compared to full operation. Thus, a load such as motor 18 could be driven continuously by inverter system 10 during failure of a cell, albeit at half or less power after failure compared with prior to failure. Further, only half of the braking torque is available after failure through SPI-U2, V2 and W2 at regeneration (braking) mode versus full braking with all six single pole inverters 28 in use along with their corresponding braking circuit 26.

Such known systems can provide continuous operation of motor 18 during failure of a power cell and can effectively provide braking torque; nonetheless, there are problems with these known systems. For instance, they may require twice as many power cells as necessary to provide three-phase power. Redundant power cells add increased expense to the system compared with a single power cell for each phase providing full voltage at full current. Additionally, during failure of a power cell, system 10 provides only half or less power to load 18 compared with full operation. Such a power reduction may be unacceptable and inefficient in many circumstances. Also, dynamic voltage sharing during transistor switching may be problematic with three-level inverter cells 16 connected in series. Such problems may be avoided with a multi-level or neutral point clamped (NPC) inverter.

Further, such a conventional system provides half or less braking torque at regeneration when one power cell is disabled, which may be inefficient and/or unsafe. Thus, mechanical braking may also be needed to assist braking when one cell is inoperable, which wastes power that could be captured during regeneration. Also, the use of individual braking circuits for each power cell may be less efficient, require more components, and be more expensive than an inverter system having a common braking circuit.

Accordingly, a need exists for a multi-inverter system that can provide greater than half of the output power during failure of a power cell without the added costs and dynamic voltage sharing problems of cell redundancy, and that can more efficiently provide braking torque during regeneration. Further, a need exists for an inverter system that can dynamically change configurations as needed to provide improved performance in various circumstances, such as the loss of power cell or for regenerative braking.

SUMMARY OF THE INVENTION

In order to overcome the above-described problems and other problems that will become apparent when reading this specification, aspects of the present invention provide a multi-inverter system that can dynamically change configurations as needed. For example, by changing configurations during operation, the multi-inverter system can provide greater than half of the full output power during failure of a power cell without the added costs of cell redundancy, and can provide efficient braking torque during regeneration. Other features and advantages of various aspects of the invention will become apparent with reference to the following detailed description and figures.

BRIEF DESCRIPTION OF THE DRAWINGS

The invention will be described in detail in the following description of embodiments with reference to the following figures wherein:

FIG. 6c shows a wye configuration of the inverter system of FIG. 6a;

FIG. 6e shows a mesh V configuration of the inverter system of FIG. 6a;

FIG. 10 is an equivalent circuit diagram of FIG. 9a.

DETAILED DESCRIPTION OF THE FIGURES

Figure 1:
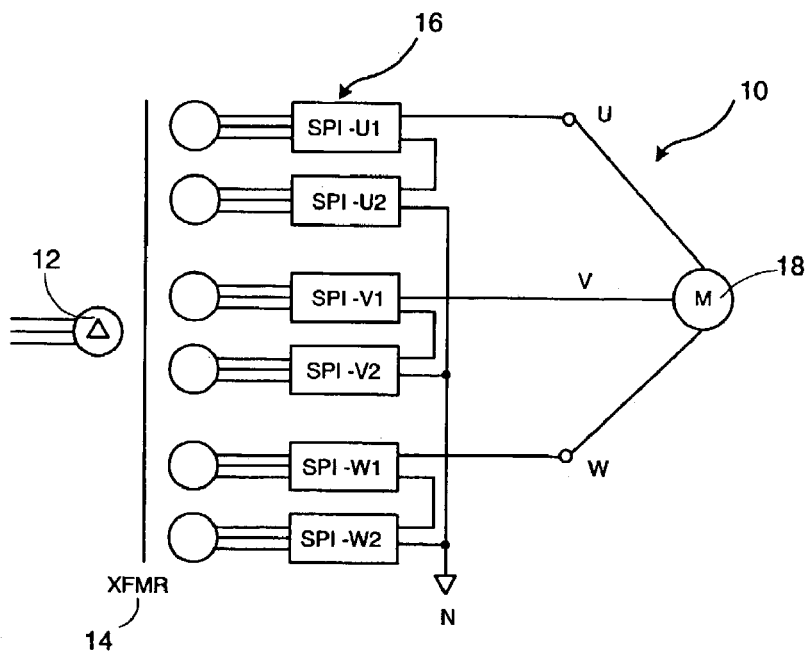
FIG. 1 shows a single pole multi-inverter system having failure related circuitry known in the art for providing reduced power when an inverter power cell fails.

The various aspects of the invention may be embodied in various forms. Referring now to FIGS. 4-6b, a three-phase inverter system 110 according to an embodiment of the invention is shown. The inverter system 110 generally includes a three-phase power source 112, a transformer 114, and three single pole neutral point clamped (NPC) inverter cells 116, 118 and 120. Inverter cells 116, 118 and 120 are connected to a load 122, such as a three-phase AC induction motor via terminals U 121, V 123 and W 125. The three-phase power source 112 may include a utility line from which stepped-down or stepped-up three-phase power is supplied to each inverter cell 116, 118 and 120 via transformer 114.

In one configuration (shown in FIG. 4) corresponding with full operation of the inverter system, inverter cells 116, 118 and 120 are connected in a three-phase star (wye) configuration to load 122. If one of the inverter cells of the wye configuration fails, it is typically not possible to continue driving the three-phase load 122. However, it may be possible to drive three-phase load 122 with only two power cells 116, 118 and 120 configured in a mesh V configuration. A mesh V configuration is generally a three-phase mesh (delta) connection in which a first terminal of each cell connects to an opposite terminal of an electrically adjacent cell to form a serial loop, except that the connection between the failed cell and an adjacent cell is disconnected.

Figure 4:
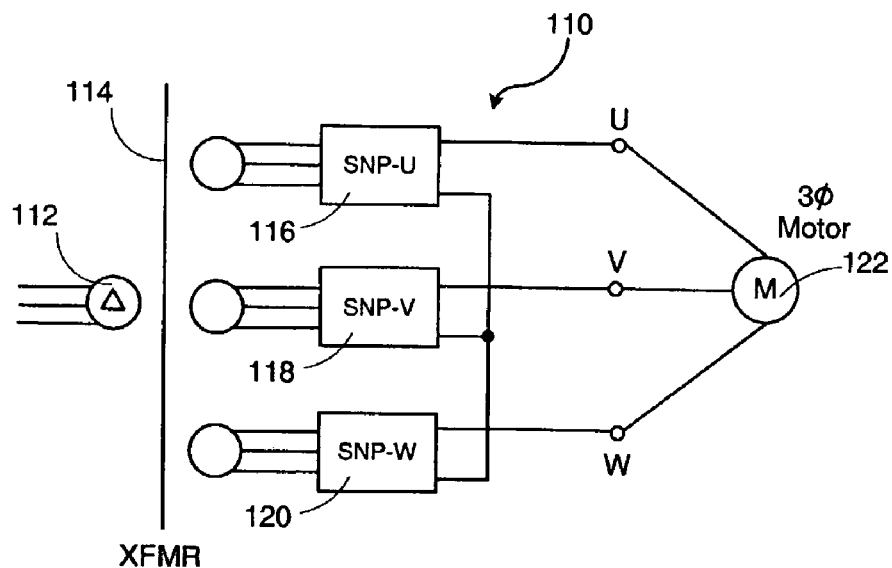
FIG. 4 shows a three-phase inverter system according to an embodiment of the invention.
Figures 6A, 6B:
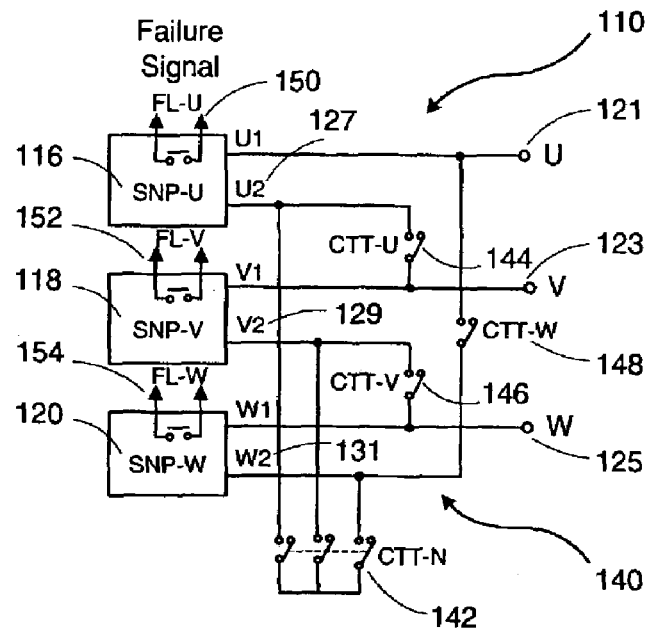
FIG. 6a shows a three-phase inverter system circuit corresponding with the inverter system of FIG. 4.
FIG. 6b is a table showing the position of contactor switches on the inverter circuit of FIG. 6a corresponding to various power cell failure modes in accordance with embodiments of the present invention.
Figure 6C:
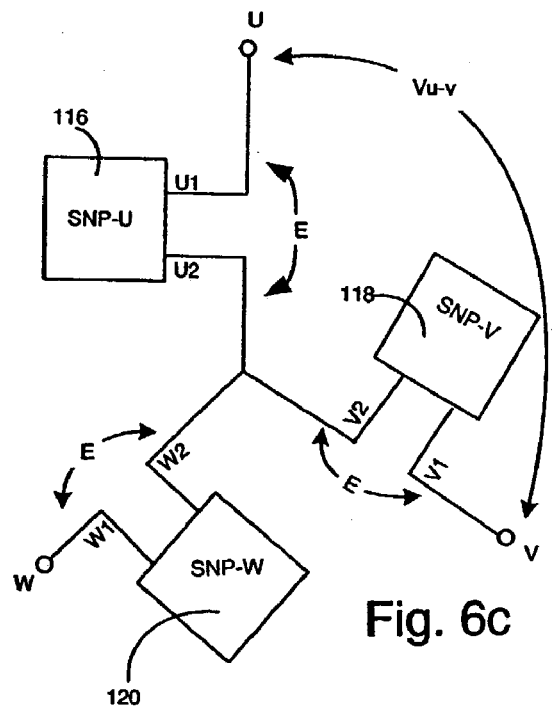
Figure 6D:
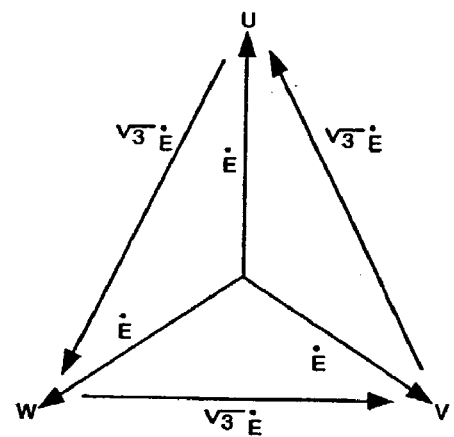
FIG. 6d shows vector diagrams corresponding to the terminal voltages of the wye configuration of FIG. 6c.

Inverter system 110 may be changed from a wye configuration as shown in FIG. 4 to a mesh configuration adapted to by-pass a failed cell, as shown in FIGS. 6a and 6b. In the mesh V configurations shown in FIGS. 6a and 6b, resultant three-phase voltages may be supplied to each terminal U, V and W even when by-passing a failed cell, albeit at voltages up to $1/\sqrt{3}$ of the voltages available from the comparable balanced wye configuration of FIG. 4. As shown in FIGS. 6a and 6b, any two operable inverter cells of cells 116, 118 and 120 may be connected in a mesh V connection to provide three-phase power to load 122.

Figure 5:
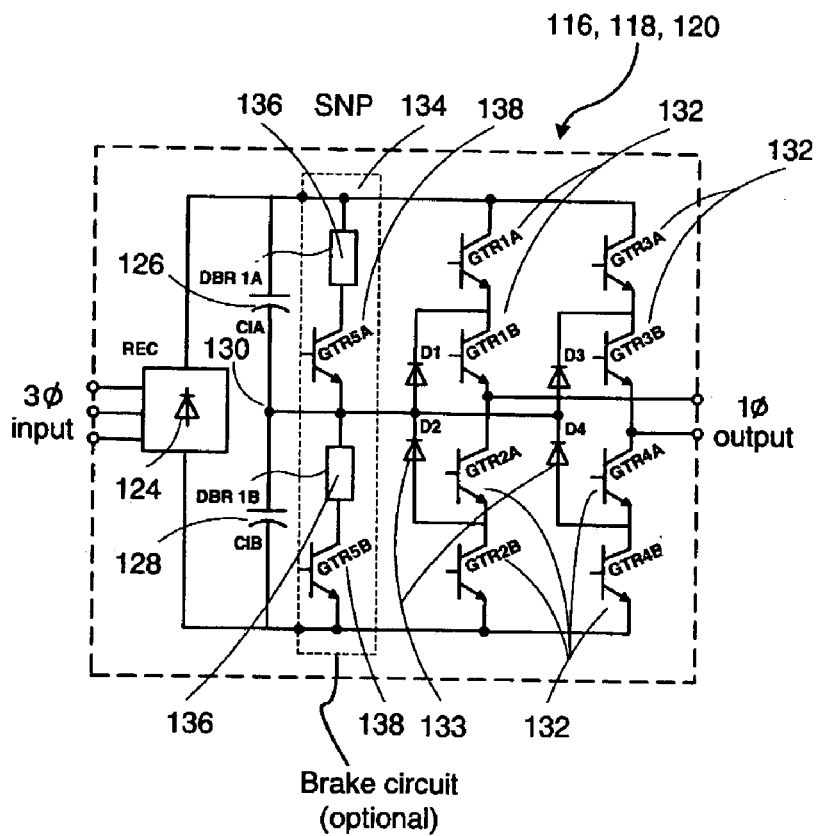
FIG. 5 is a circuit diagram of one of the inverter cells that may be used with the inverter system of FIG. 4.

FIG. 5 shows a circuit diagram of one of the NPC inverter cells 116, 118 and 120 according to an embodiment of the invention. Each NPC inverter cell 116, 118 and 120 is a five-level, single-phase inverter using gate-turn-off (GTO) devices. As is known in the relevant art, the rectifier bridge (REC) 124 of each inverter 116, 118 and 120 receives three-phase power from transformer 114 and converts it to DC power. C1A 126 and C1B 128 are DC voltage smoothing capacitors connected in series with a neutral point 130 formed in between. GTR1A through GTR4B 132 are transistors for inverting DC power to AC power. D1 through D4 133 are neutral point clamp diodes. The output voltage is generally controlled by a pulse width modulation (PWM) technique known in the art for determining switching points of GTO devices (e.g. transistors) in the inverters. For example, cells 116, 118 and 120 each have $2^8$ or 256 switching states based on the 8 transistors 132 that can be controlled using PWM techniques to provide an AC waveform output.

Figure 2:
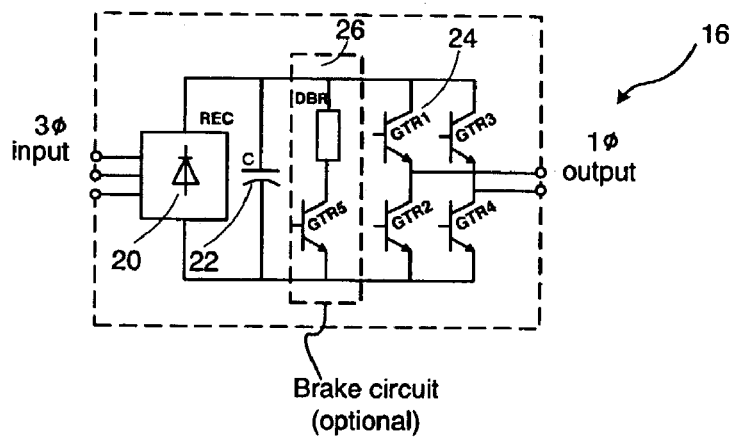
FIG. 2 is a circuit diagram of one of the single pole inverter cells of the inverter system of FIG. 1.
Figure 3:
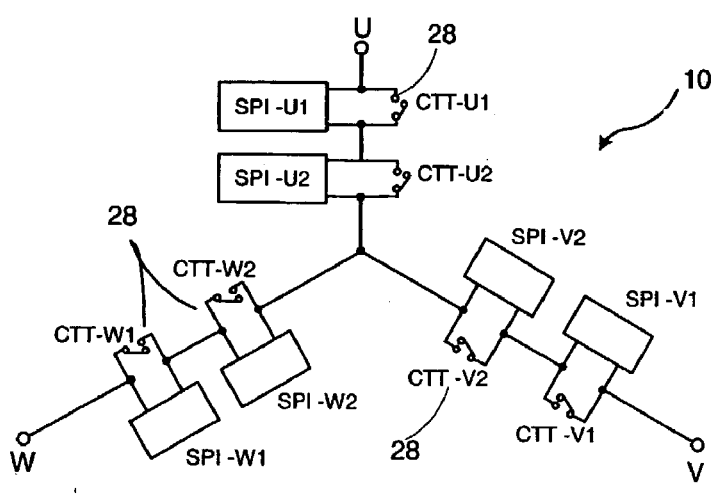
FIG. 3 shows a three-phase inverter circuit corresponding with the inverter system of FIG. 1.

NPC inverter cells 116, 118 and 120 provide advantages over the three-level inverter cells 16 shown in FIG. 2. For example, using similar components, transistors GTR1B, GTR2A, GTR3B and GTR4A connected in series with matched transistors GTR1A, GTR2B, GTR3A and GTR4B respectively in a single NPC inverter cell can provide double the line voltage with the same input compared with one of the three-level inverter cells 16. Transistors GTR1B, GTR2A, GTR3B and GTR4A act as the main inverter devices, similar to GTR1, GTR2, GTR3 and GTR4 of cell 16. Transistors GTR1A, GTR2B, GTR3A and GTR4B act as auxiliary devices, which assist in clamping the output potential to neutral point 130 using neutral point clamp diodes D1 through D4. Accordingly, a single pole NPC inverter cell 116, 118 and 120 can have double the output voltage with the same current compared to a three-level inverter cell 16. Thus, inverter system 110 having three NPC inverter cells is simpler, easier to control, and generally less expensive than inverter system 10 having six three-level inverter cells.

As further shown in FIG. 5, an optional braking circuit 134 may be added to each inverter cell 116, 118 and 120 to provide braking torque during deceleration. Braking circuit 134 may include braking resistor DBR1A and DBR1B 136 connected in series with a respective braking transistor GTR5A and GTR5B 138 on each side of neutral point 130. Each braking transistor 138 switches on as needed when the DC bus voltage increases at regeneration mode to dissipate excess voltage build-up. Each braking circuit 134 may also supply power back to a power grid.

Referring now to FIG. 6a, inverter cells 116, 118 and 120 are shown interconnected via a configuration switch system 140. Switch system 140 generally includes common neutral contactor switch unit CTT-N 142 and star/mesh contactor switches CTT-U 144, CTT-V 146 and CTT-W 148. CTT-N 142 connects the neutral terminals U2 127, V2 129 and W2 131 respectively of cells 116, 118 and 120 together to form a common neutral between the cells. As such, the contactor switches of CTT-N 142 are opened or closed together as a set to enable or disable a common neutral. When the switches of CTT-N 142 are closed, star/mesh switches 144, 146 and 148 are preferably open, and cells 116, 118 and 120 are thereby connected in a wye configuration having a common neutral.

Each one of the star/mesh contactor switches 144, 146 and 148 connect one terminal of one cell, for example U2 127, V2 129 and W2 131, to the opposite terminal (e.g. U1 121, V1 123 and W1 125) of an adjacent cell to form a mesh configuration. When any of the star/mesh contactor switches 144, 146 and 148 are closed, common neutral contactor switches 142 are preferably open and vice-versa. In combination, neutral switches 142 and star/mesh switches 144, 146 and 148 work together to change the configuration of cells 116, 118 and 120 between a wye configuration and a mesh configuration. The configuration switch system is adapted to dynamically change the star configuration of the inverter system to a mesh configuration during operation when needed.

The ability to switch connection configurations provides advantages. For example, it may permit operation of a three-phase synchronous motor to continue after the loss of a power cell. This is because a wye configuration inverter system typically cannot supply three-phase power to load 122 when one phase is unavailable. As such, the loss of a single power cell in a three power cell inverter system connected in wye terminates operation of a three-phase induction motor driven by the inverter system. An inverter system that can switch to a mesh configuration when there is a problem with one phase may permit continued operation of the three-phase induction motor by using the two operable power cells connected in a mesh V configuration. There may also be other advantages for dynamically switching between configurations, such as to modify the output voltages or to modify control of the system.

The position of each one of switches 142–148 may be controlled by a configuration control circuit (not shown), which is a logic control circuit as is known in the art that opens and closes switches based on various inputs and logic states. The configuration control circuit (not shown) may be part of the PWM control circuit (not shown) that controls the switching states of the transistors 132, or it may be an independent unit. In one embodiment, the inputs to the configuration control circuit (not shown) include a failure signal 150, 152 and 154 received from one or more of the power cells 116, 118 and 120. An embodiment of the invention including a circuit for detecting cell failure and for providing a failure signal will be discussed later with regard to FIG. 7. If more than one power cell fails, the configuration control circuit (not shown) may take steps to shut down the entire inverter system 110. If only one power cell fails, the configuration control circuit (not shown) may adjust switches 142–148 to change the power cell configuration of inverter system 110.

FIG. 6b is a table showing the position of each switch 142–148 based on the operational status of each cell 116–120 according to an embodiment of the invention. When all cells are operational, common neutral contactor switches CTT-N 142 are preferably closed and all three star/mesh contactor switches 144, 146 and 148 are preferably open, thereby providing a common neutral for cells 116, 118 and 120. Accordingly, all three operational cells 116, 118 and 120 are connected in a wye configuration. If any one of power cells 116, 118 and 120 fails, then the respective star/mesh contactor switch located between the neutral terminal of the failed cell and an adjacent cell is preferably opened along with the common neutral contactor switches 142.

For example, suppose inverter system 110 is providing three-phase power to load 122 via terminals U 121, V 123 and W 125 in a fully-operational balanced wye configuration. As such, common neutral contactor switches 142 are closed and star/mesh switches 144, 146 and 148 are open. Suppose further that power cell SNP-U 116 begins to fail, which results in the generation of failure signal FL-U 150. Upon sensing failure signal 150, control unit (not shown) opens common neutral contactor switches 142 and closes star/mesh switches 146 and 148 corresponding to power cells SNP-V 118 and SNP-W 120.

Figure 6E:
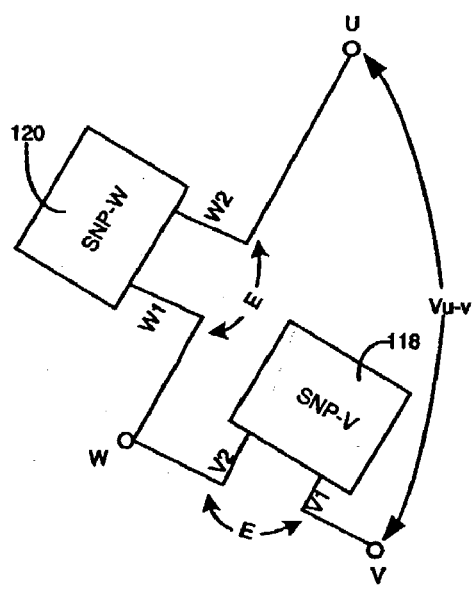
Figure 6F:
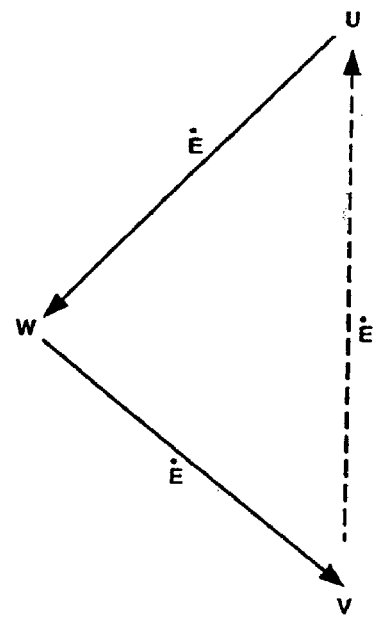
FIG. 6f shows vector diagrams corresponding to the terminal voltages of the mesh V configuration of FIG. 6e.

Accordingly, the connection configuration becomes a mesh V configuration as shown in FIGS. 6b, 6e and 6f with resultant terminal voltages being supplied to load 122 via terminals U 121, V 123 and W 125. The resultant terminal voltages, however, are approximately $1/\sqrt{3}$ of the voltages supplied to terminals U, V and W in the fully operational balanced wye configuration. For example, FIGS. 6c–6f show phase voltages between terminals U, V and W for both a wye configuration and a V configuration. E represents the output voltage of a single phase inverter cell. Vu-v represents the voltage between terminals U and V. For a wye configuration, Vu-v=$\sqrt{3}$E and for the V configuration shown, Vu-v=E. As such, $1/\sqrt{3}$ of the full operational voltage may be supplied to load 122 for a mesh V configuration.

Figure 7:
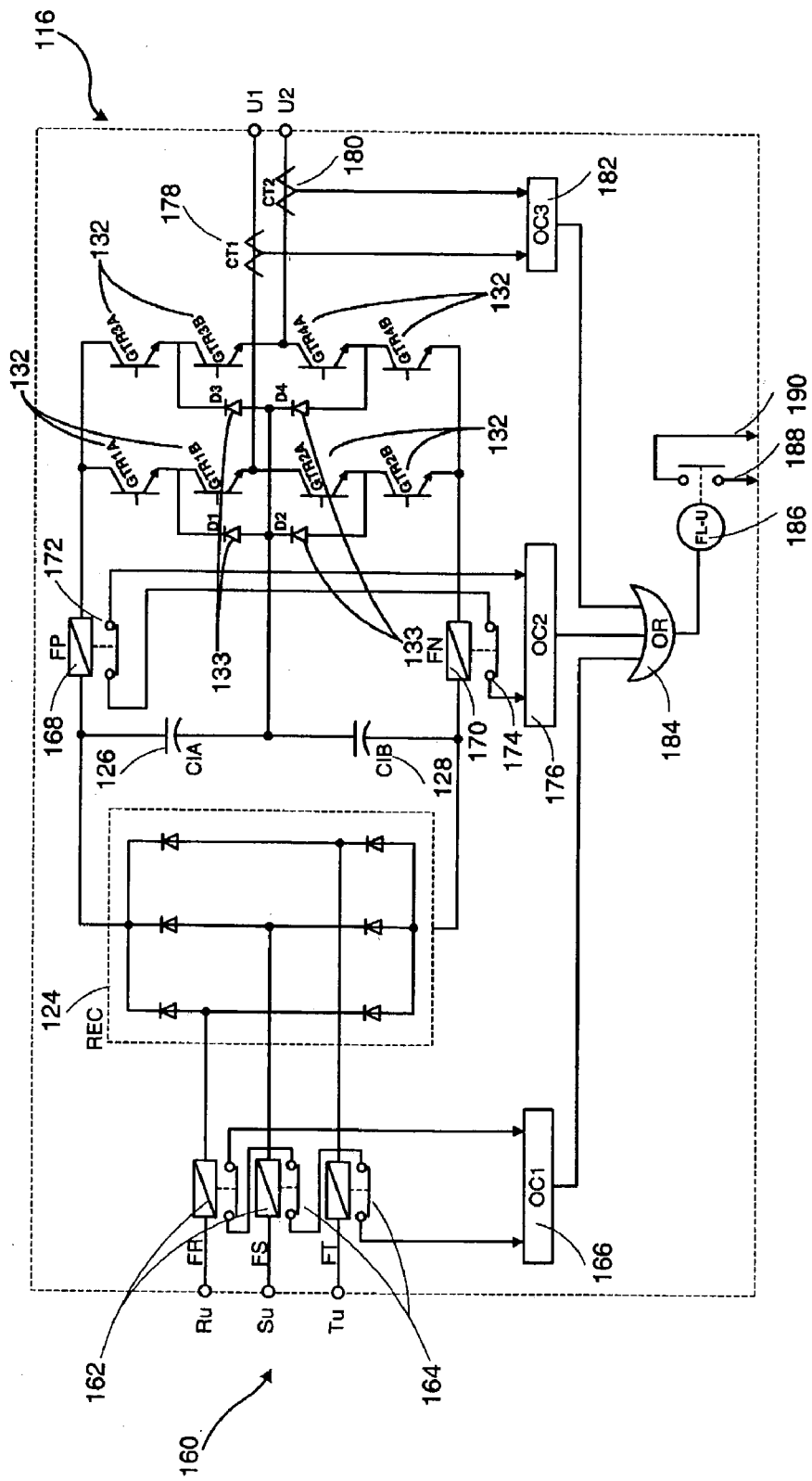
FIG. 7 is a circuit diagram of one of the inverter cells of the inverter system of FIG. 4 showing circuitry for generation of a failure signal according to another embodiment of the invention.

Referring now to FIG. 7, a circuit diagram is shown of one of the inverter cells (e.g. SNP-U 116) of the inverter system 110 showing circuitry for generation of a failure signal (e.g.

150), according to another embodiment of the invention. Except for aspects related to generation of a failure signal or to braking circuitry, inverter cell 116 shown in FIG. 7 is generally the same as the inverter cell shown in FIG. 4. As shown, connected to rectifier 124 are AC input terminals Ru, Su and Tu 160. Between each one of the input terminals 160 and rectifier 124 is an input AC line fuse 162 having a corresponding signal switch 164. Fuses 162 are adapted to blow when the AC input current exceeds a pre-determined rating that may occur when circuitry of power cell 116 fails. For example, failure of rectifier 124 may cause over current through one of fuses 162. When one of fuses 162 blows, the corresponding signal switch 164 opens. Because signal switches 164 are connected in series, if any one of them is open, a logic signal conversion circuit OC1 166 detects the open circuit.

As also shown in FIG. 7, DC line fuses FP 168 and FN 170 are connected respectively along the two output terminals of inverter 116. Each fuse 168 and 170 includes a corresponding signal switch 172, 174 connected to each other in series. Fuses 168 and 170 are adapted to blow when the DC bus current, which comes from rectifier 124 and capacitors 126, 128, exceeds a pre-determined current rating that may occur when circuitry of power cell 116 fails. For example, failure of one or more transistors 132 or diodes 133 may cause over current through one of fuses 168 or 170. When one of fuses 168 or 170 blows, the corresponding signal switch 172, 174 opens. Because signal switches 172 and 174 are connected in series, if any one of them is open, a logic signal conversion circuit OC2 176 detects the open circuit.

FIG. 7 further shows current transformers CT1 178 and CT2 180 connected to a respective one of the AC output terminals U1 and U2 for detecting the output current. In certain circumstances, such as when pulse width modulation (PWM) control of inverter cell 116 is improper, the output current may be excessive. An over current detection circuit OC3 182 is connected to current transformers 178 and 180, for detecting whether the current measured through either one of current transformers 178 and 180 exceeds a predetermined level.

OC1 166, OC2 176 and OC3 182 are each connected to an "OR" logic circuit 184, which is connected to relay coil FL-U 186. During operation, if either of conversion circuits 166, 176 detect a respective blown fuse, the one detecting the blown fuse signals "OR" logic circuit 184. Likewise, if detection circuit 182 detects excessive output current, it signals "OR" logic circuit 184. Upon reception of such a signal from any one of circuits 166, 176 or 182, "OR" logic circuit signals relay coil 186. In response, relay coil 186 closes failure switch 188 of failure signal circuit 190, thereby signaling failure of power unit 116. The logic control unit (not shown) connected to failure signal circuit 190 thereafter senses the failure signal and proceeds to change the inverter system 110 from a wye configuration to mesh V configuration as appropriate.

Figures 8A, 8B:
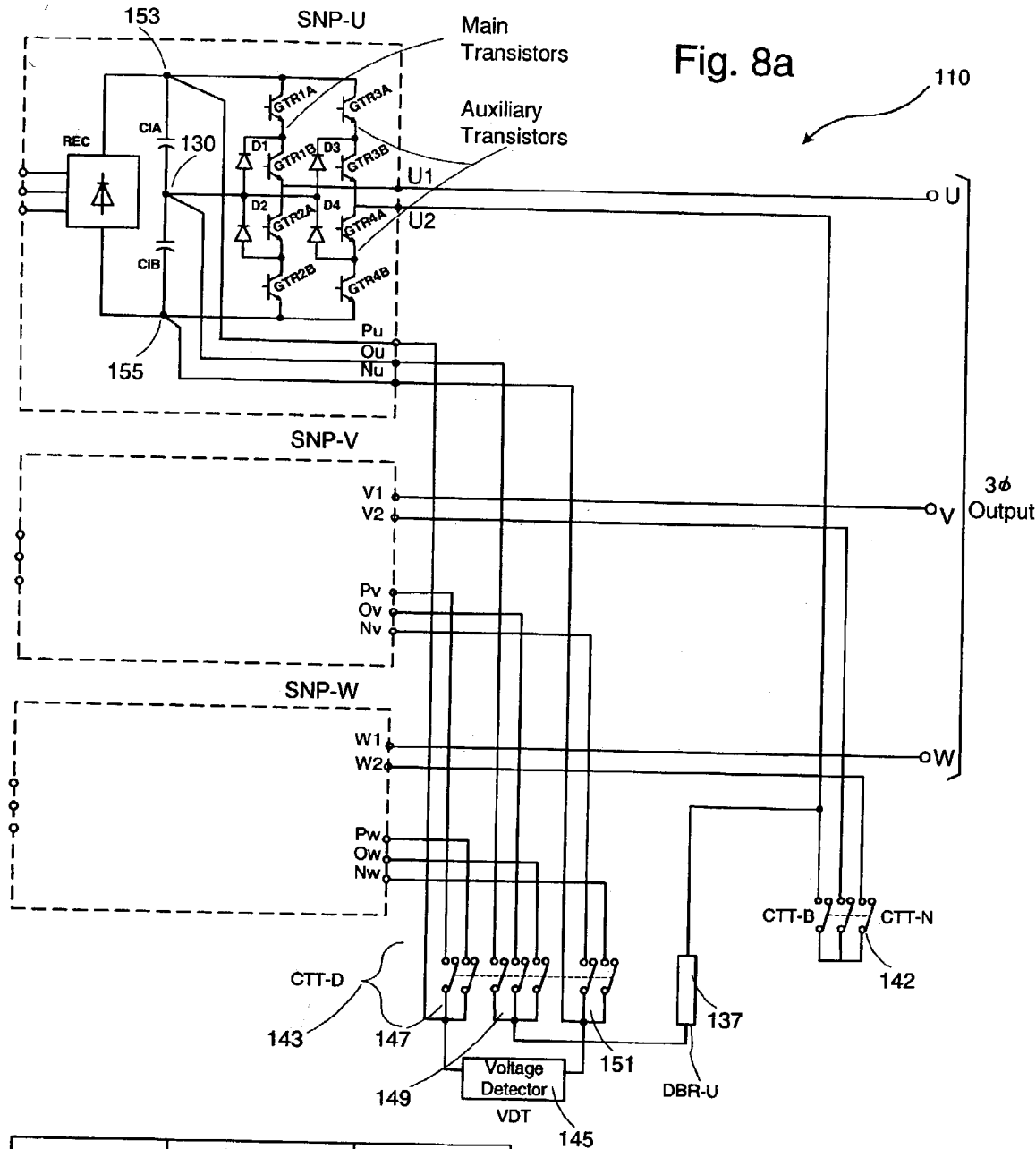
FIG. 8a shows an embodiment of the invention based on the inverter system of FIG. 4 that may be configured as a three-phase inverter cell having a single braking resistor.
FIG. 8b is a table showing the position of contactor switches of the inverter system of FIG. 8a during a running mode and a braking mode in accordance with embodiments of the present invention.

FIGS. 8a and 8b show inverter system 110 according to a further embodiment of the invention along with a table showing the position of additional contactor switches during a running mode and a braking mode. Except for aspects and preferences related to braking circuitry and the additional contactor switches, inverter system 110 is generally the same as the previous embodiment. The configuration switch system 140 (shown in FIG. 6a) according to this embodiment further includes common DC bus contactor switches 143 and a voltage detector 145.

When the DC bus contactor switches 143 are closed and common neutral contactor switches 142 opened, power cells 116, 118 and 120 are electrically connected to form a single three-phase inverter cell. As such, inverter system 110 may effectively be changed from three individual power cells in a star or mesh configuration collectively providing three-phase output voltage to a three-phase inverter power cell. As a three-phase power cell, a common braking resistor 137 may dissipate excess voltage during braking mode. As such, rather than having a braking circuit 134 in each power cell (shown in FIG. 4), the inverter system 110 of this embodiment only needs a single common braking resistor 137. Further, auxiliary transistors GTR3A, GTR3B, GTR4A and GTR4B may be switched to control dissipation of over-voltage through braking resistor 137 rather than a dedicated braking resistor switching device. Thus, fewer parts are required and the inverter system is simplified.

As shown in FIG. 8a, DC bus contactor switches 143 include a positive switch set 147, a neutral switch set 149, and a negative switch set 151. When closed, the positive switch set 147 electrically connects together the positive DC buses 153 of each power cell 116, 118 and 120. Similarly, when closed, the neutral switch set 149 electrically connects together the neutral point 130 of each power cell 116, 118 and 120. Likewise, when closed, the negative switch set 151 electrically connects together the negative DC buses 155 of each power cell 116, 118 and 120.

As shown in FIG. 8b, during normal running of inverter system 110, common neutral contactor switches 142 are closed and inverter cells 116, 118 and 120 are connected in a wye configuration. As motor 122 driven by inverter system 110 changes to a deceleration mode, switches 142 preferable open first and then switches 143 close. Configuration control unit (not shown) preferably instructs the respective switches to open and close based on sensing the deceleration of motor 122; however, it may do so for other reasons, such as in response to a command to stop motor 122. When switches 143 close, transistors GTR1A, GTR1B, GTR2A and GTR2B of each power cell 116, 118 and 120 collectively form a three-phase NPC circuit. During deceleration, GTR1A, GTR1B, GTR2A and GTR2B are switched to regenerate DC current, which may be sent back to the power grid, stored or dissipated. Voltage detector 145 is connected to the positive switch set 147 and the negative switch set 151, and detects over-voltage of capacitors C1A and C1B. When over-voltage is detected, transistors GTR3A, GTR3B, GTR4A and GTR4B are switched to consume the charges of C1A and C1B through resistor DBR-U 137 via common neutral point 130 and neutral switch set 149. As such, an additional switching device is not required for regenerative braking, such as transistor 138 of FIG. 5, which saves components and may therefore reduce costs.

Figures 9A, 9B:
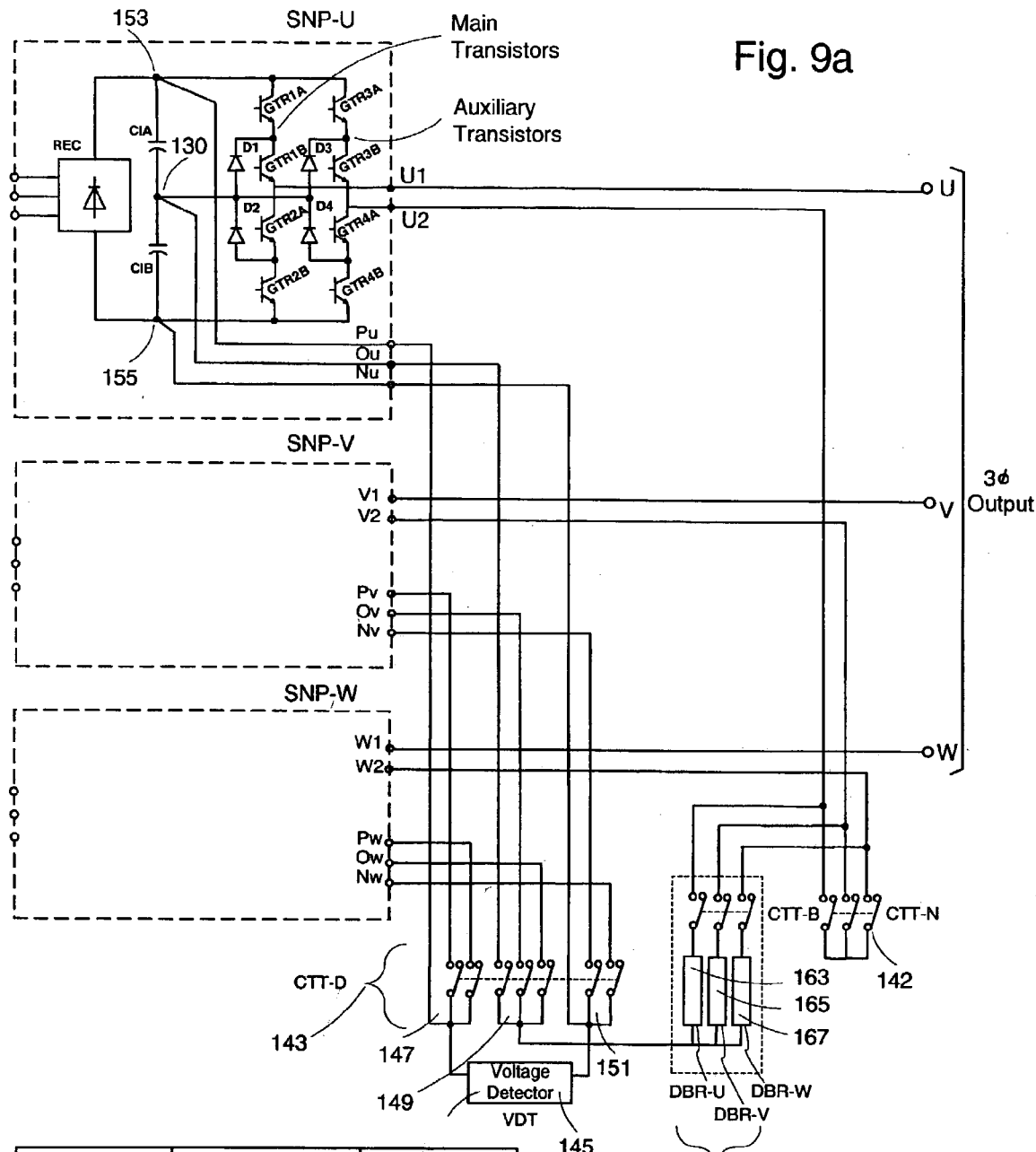
FIG. 9a shows an embodiment of the invention based on the inverter system of FIG. 4 that may be configured as a three-phase inverter cell having a plurality of braking resistors connected in parallel in accordance with aspects of the present invention.
FIG. 9b is a table showing the position of contactor switches of the inverter system of FIG. 9a during a running mode and a braking mode in accordance with embodiments of the present invention.

FIGS. 9a and 9b show inverter system 110 according to yet another embodiment of the invention along with a table showing the position of contactor switches during a running mode and a braking mode. Except for aspects and preferences related to braking circuitry and the additional contactor switches, inverter system 110 is generally the same as the previous embodiment shown in FIGS. 8a and 8b. The configuration switch system 140 (shown in FIG. 6a) according to this embodiment further includes resistor contactor switches 161 and three braking resistors 163, 165 and 167. Braking resistors 163, 165 and 167 operate in parallel to provide a larger braking torque than system 110 of FIG. 8a.

Figure 10:
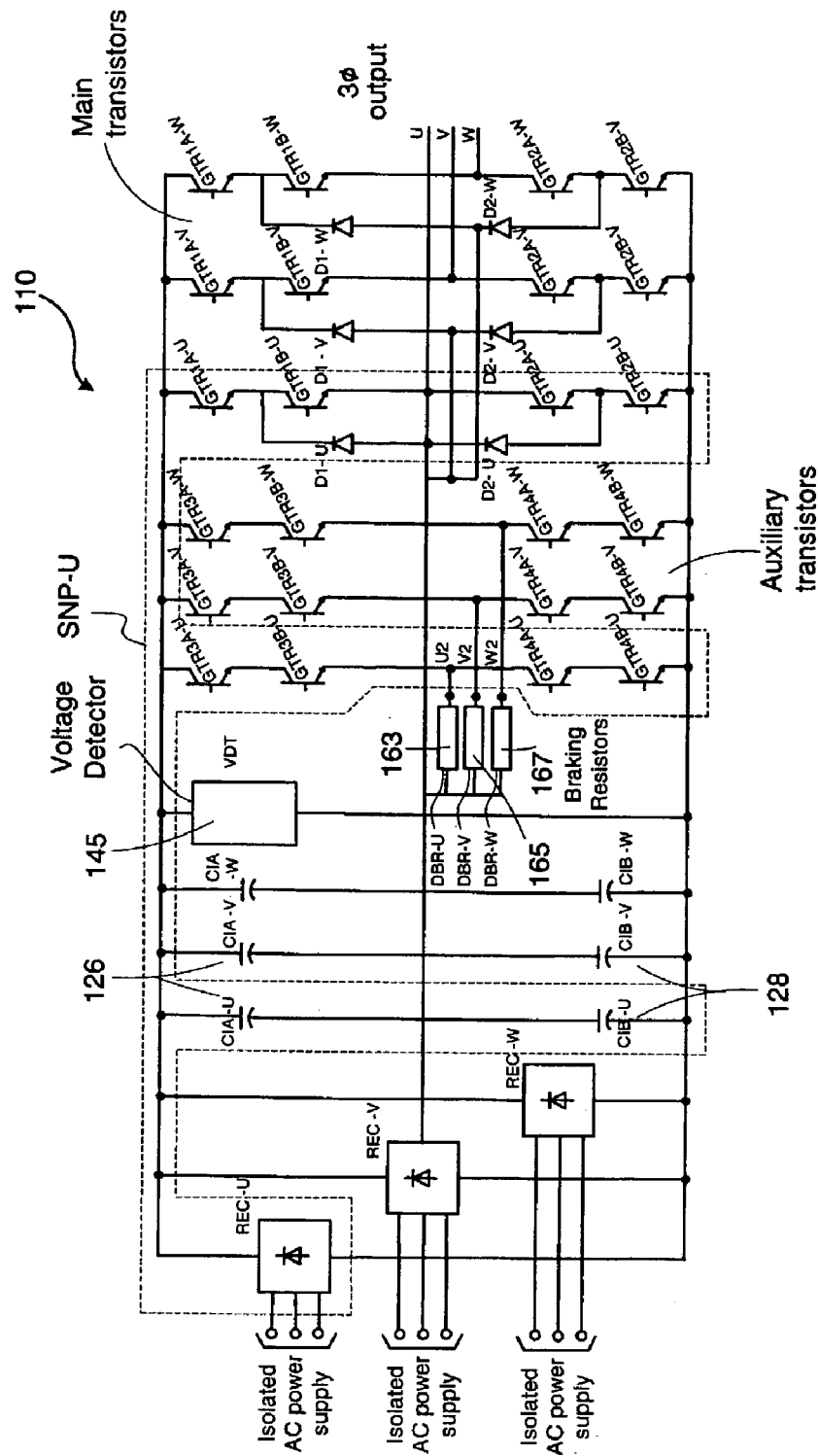

FIG. 10 shows an equivalent circuit for inverter system 110 of FIG. 9a configured as a three-phase NPC inverter cell operating in the regenerative braking mode. For simplicity, the closed switches of CTT-B 161 and CTT-D 143 are eliminated from the diagram and the equivalent components are simply shown connected to each other. As with FIG. 9a, an additional switching device is not required to dissipate excess voltage through resistors 163, 165 and 167. For example, the switching of GTR3A-U, GTR2B-U, GTR4A-U and GTR4B-U is controlled to consume over-voltage in capacitors C1A-U and C1B-U together with C1A-V, C1B-V and C1A-W, C1B-W through resistor DBR-U 163. Similarly, the switching of GTR3A-V, GTR3B-V, GTR4A-V and GTR4B-V is controlled to consume over-voltage in capacitors C1A-V and C1B-V together with C1A-U, C1B-U and C1A-W, C1B-W equally through resistor DBR-V 165. Likewise, the switching of GTR3A-W, GTR3B-W, GTR4A-W and GTR4B-W is controlled to consume over-voltage in capacitors C1A-W and C1B-W together with C1A-U, C1B-U and C1A-V, C1B-V equally through resistor DBR-W 167.

While the present invention has been described in connection with the illustrated embodiments, it will be appreciated and understood that modifications may be made without departing from the true spirit and scope of the invention. In particular, the invention applies to various types of inverter systems including various polyphase systems, such as a two-phase or a four-phase system. Further, the invention is applicable to various types of inverter cells, such as two-level cells and NPC cells. Additionally, configurations of inverter systems may be modified to adapt to situations other than the loss of a power cell or for regeneration braking. For example, configurations may be dynamically modified to provide different voltage output or current outputs, or for control purposes.

I claim:

1. A method of driving a motor load using an inverter drive system to continue operation during a failure mode, the inverter drive system comprising three single vale NPC inverters connected to each other via a plurality of contactor switches adapted to connect the single vole NPC inverters ma plurality of configurations, the method comprising:
    switching some of the contactor switches to connect the single pole NPC inverters in a star configuration;
    driving the motor load using the inverter drive system in the star confinuration during a nornal mode of operation; and
    switching some of the contactor switches to connect the single pole NPC inverters in a second continuation in which a first and a second non-damaged single pole NPC inverter of the three single pole NPC inverters are connected to drive the motor load when a third single pole NPC inverter of the three single pole NPC inverters has failed;
    wherein for the step of switching some of the contactor switches to connect the single pole NPC inverters in a second configuration, the second configuration comprises a mesh V connection.

2. The method of claim 1 wherein for the step of switching some of the contactor switches to connect the single pole NPC inverters in a second configuration, the second configuration comprises a polyphase inverter ford from the single pole NPC inverters.

3. The method of claim 2, wherein the step of switching some of the contactor switches to connect the single pole NPC inverters in a second configuration comprises:
    detecting a deceleration mode for the motor,
    switching soar of the contactor switches to disable a common neutral between phases of the inverter drive system in the star configuration; and
    switching some of the contactor switches to connect together DC buses of the single pole NFC inverters for forming a polyphase inverter.

4. A method of driving a motor load using an inverter drive system, the inverter drive system comprising a plurality of single pole NPC inverters connected to each other via a plurality of contactor switches adapted to connect the single pole NPC inverters in a plurality of configurations, the method comprising:
    switching some of the contactor switches to connect the single pole NPC inverters in a star configuration;
    driving the motor load using the inverter drive system in the star configuration; and
    switching some of the contactor switches to connect the single pole NPC inverters in a second configuration;
    wherein, for the step of switching some of the contactor switches to connect the single pole NFC inverters in a second configuration, the second configuration comprises a mesh V connection;
    wherein the step of switching some of the contactor switches to connect the single pole NPC inverters in a second configuration comprises:
    sensing a failure in one of the single pole NPC inverters of the inverter drive system in a star configuration;
    switching some of the contactor switches to disable a common neutral between phases of the inverter drive system in the star configuration;
    switching some of the contactor switches to connect the single pole NPC inverters in a mesh configuration that by-passes the failed inverter.

5. An inverter drive system adapted to change configurations from a plurality of single pole inverter cells configured in a three-phase delta or mesh configuration into a three-phase inverter cell, the inverter drive system comprising:
    a first NPC inverter cell having a positive DC bus, a negative DC bus, and a neutral point;
    a second NPC inverter cell having a positive DC bus, a negative DC bus, and a neutral point
    a third NPC inverter cell having a positive DC bus, a negative DC bus, and a neutral point;
    a positive DC bus contactor switch set connecting together the positive DC buses of the NPC, inverter cells;
    a negative DC bus contactor switch set connecting together the negative DC buses of the NPC inverter cells;
    a neutral point contactor switch set connecting together the neutral points of the NPC inverter cells;
    at least one braking resistor connected to a second terminal of each NPC inverter cell at one end and the neutral point contactor switch set at a second end; and
    a voltage detector connected across the positive and negative DC buses of the NPC inverter cells for detecting over-voltage in the DC buses of the polyphase inverter;
    wherein, when the neutral point contactor switch set and the DC bus contactor switch sets are closed, the inverter drive system is configured to he a polyphase inverter.

6. The inverter drive system of claim 5, wherein each NPC inverter cell further comprises a plurality of main transistors and a plurality of auxiliary transistors, and wherein the plurality of auxiliary transistors are adapted to switch on and off to control dissipation of the over-voltage in the DC buses through the at least one braking resistor when the inverter drive system is configured as a polyphase inverter and the voltage detector detects over-voltage.

7. The inverter drive system of claim 5, wherein the at least one bracing resistor comprises a plurality of braking resistors connected in parallel.

8. The method of claim 3, further comprising:
connecting the polyphase inverter to one braking resistor at an unused terminal for the polyphase inverter, and
dissipating over-voltage in the polyphase inverter through the at least one braking resistor.

9. An inverter drive system adapted to change configurations from a plurality of single pole inverter cells configured in a three-phase wye configuration into a three-phase mesh V configuration upon failure of one of the single pole inverter cells, the inverter drive system operating with a failed inverter cell in a three-phase mesh V configuration to provide three-phase power to a load using two inverter cells, the inverter drive system comprising:
a first single pole NPC inverter cell having a first terminal, a second terminal, and a failure detection circuit configured to provide a failure signal if the first NPC inverter cell fails, the first terminal providing output for driving a load when the NPC inverter cell is operating properly;
a second single pole NPC inverter cell having a first terminal, a second terminal, and a failure detection circuit configured to provide a failure signal if the second NPC inverter cell fails, the first terminal providing output for driving a load when the NPC inverter cell is operating properly;
a failed third single pole NPC inverter cell having a first terminal, a second terminal, and a failure detection circuit, the first terminal configured to provide output for driving a load when the third NPC inverter cell is operating properly;
a three-phase load connected to the first terminal of each of the first, second and third single pole NPC inverter cells and receiving three-phase power from the first terminals of the inverter cells;
a first contactor switch in a closed position connecting the second terminal of the first NPC inverter cell with the first terminal of the second NPC inverter cell;
a second contactor switch in a closed position connecting the second terminal of the second NPC inverter cell with the first terminal of the third NPC inverter cell;
a third contactor switch in an open position that, when closed, connects the second terminal of the third NPC inverter cell with the first terminal of the third NPC inverter cell;
a fourth contactor switch in an open position that, when closed, connects the second terminal of the first NPC inverter cell with a common neutral between the first, second and third NPC inverter cells;
a fifth contactor switch in an open position that, when closed, connect the second terminal of the second NPC inverter cell with a common neutral between the first, second and third NPC inverter cells;
a sixth contactor switch in an open position that, when closed, connects the second terminal of the third NPC inverter cell with a common neutral between the first, second and third NPC inverter cells;
wherein the first and second single pole NPC inverter cells provide three phase power to the load via the first terminals of the first, second and third single pole NPC inverter cells in a mesh V configuration and, if the third NPC inverter cell is operating properly with the first and second single pole NPC inverter cells, the first, second and third contactor switches are open and the third, fourth and fifth contactor switches are closed to configure the inverter drive system in a three-phase wye configuration.

10. An inverter drive system comprising:
a first single pole NPC inverter cell having a first terminal, a second terminal, a positive direct current bus, a negative direct current bus and a neutral point, the first terminal providing output for driving a load when the NPC inverter cell is operating properly;
a second single pole NPC inverter cell having a first terminal, a second terminal, a positive direct current bus, a negative direct current bus and a neutral point, the first terminal providing output for driving a load when the NPC inverter cell is operating properly;
a third single pole NPC inverter cell having a first terminal, a second terminal, a positive direct current bus, a negative direct current bus and a neutral point, the first terminal providing output for driving a load when the NPC inverter cell is operating properly;
a three-phase load connected to the first terminal of each of the first, second and third single pole NPC inverter cells and receiving three-phase power from the first terminals of the inverter cells;
a voltage detector adapted to detect excess direct current bus voltage of the single pole NPC inverter cells, the voltage detector having a positive side connected to the positive direct current bus of the first single pole NPC inverter cell and a negative side connected to the negative direct current bus of the first single pole NPC inverter cell;
one or more braking resistors for dissipating over-voltage, the one or more braking resistors having a first side and a second side;
a first contactor switch in an open position during normal operation and in a closed position during a braking mode, the first contactor switch connected between the positive direct current bus of the second single pole NPC inverter cell and the positive side of the voltage detector;
a second contactor switch in an open position during normal operation and in a closed position during the braking mode, the second contactor switch connected between the positive direct current bus of the third single pole NPC inverter cell and the positive side of the voltage detector;
a third contactor switch in an open position during normal operation and in a closed position during the braking mode, the third contactor switch connected between the negative direct current bus of the second single pole NPC inverter cell and the negative side of the voltage detector;
a fourth contactor switch in an open position during normal operation and in a closed position during the braking mode, the second contactor switch connected between the negative direct current bus of the third single pole NPC inverter cell and the negative side of the voltage detector;
a fifth contactor switch in an open position during normal operation and in a closed position during the braking mode, the fifth contactor switch connected between the neutral point of the first single pole NPC inverter cell and the first side of the one or more braking resistors;
a sixth contactor switch in an open position during normal operation and in a closed position during the braking mode, the sixth contactor switch connected between the neutral point of the second single pole NPC inverter cell and the first side of the one or more braking resistors;

a seventh contactor switch in an open position during normal operation and in a closed position during the braking mode, the seventh contactor switch connected between the neutral point of the third single pole NPC inverter cell and the first side of the one or more braking resistors;

an eighth contactor switch in a closed position during normal operation and in an open position during the braking mode, a first side of the eighth contactor switch connected of the second terminal of the first single pole NPC inverter cell, the eighth contactor switch connected to the second side of the one or more braking resistors;

a ninth contactor switch in a closed position during normal operation and in an open position during the braking mode, a first side of the ninth contactor switch connected to the second terminal of the second single pole NPC inverter cell and a second side of the ninth contactor switch connected to the eight contactor switch;

a tenth contactor switch in a closed position during normal operation and in an open position during the braking mode, a first side of the tenth contactor switch connected to the second terminal of the third single pole NPC inverter cell and a second side of the tenth contactor switch connected to the eight contactor switch;

wherein the one or more braking resistors dissipate direct current voltage during the braking mode.

\* \* \* \* \*

UNITED STATES PATENT AND TRADEMARK OFFICE
CERTIFICATE OF CORRECTION

PATENT NO. : 7,088,073 B2  Page 1 of 1
APPLICATION NO. : 10/350076
DATED : August 8, 2006
INVENTOR(S) : Takashi Morishita It is certified that error appears in the above-identified patent and that said Letters Patent is hereby corrected as shown below:

In Column 9, Claim 1, Line 43:
　　Please replace "nornal" with --normal--.

In Column 9, Claim 2, Line 59:
　　Please replace "ford" with --formed--.

In Column 9, Claim 3, Line 65:
　　Please replace "soar" with --some--.

In Column 10, Claim 3, Line 2:
　　Please replace "NFC" with --NPC--.

In Column 10, Claim 4, Line 17:
　　Please replace "NFC" with --NPC--.

In Column 10, Claim 5, Line 59:
　　Please replace "he" with --be--.

Signed and Sealed this

Twentieth Day of March, 2007

JON W. DUDAS
*Director of the United States Patent and Trademark Office*